United States Patent
Kato et al.

[11] Patent Number: 5,571,579
[45] Date of Patent: Nov. 5, 1996

[54] ALIGNMENT FILM FOR LIQUID CRYSTAL, LIQUID CRYSTAL-SANDWICHED PANEL, LIQUID CRYSTAL DISPLAY MODULE AND MATERIAL FOR LIQUID CRYSTAL ALIGNMENT FILM

[75] Inventors: Toshihiko Kato, Tsukuba; Masami Yusa, Shimodate; Nobuo Miyadera, Tsukuba; Hideyuki Hashimoto, Tsukuba; Yasuo Miyadera, Tsukuba; Masahiro Kawakami, Hitachi, all of Japan

[73] Assignee: Hitachi Chemical Company, Ltd, Tokyo, Japan

[21] Appl. No.: 326,151

[22] Filed: Oct. 19, 1994

Related U.S. Application Data

[63] Continuation of Ser. No. 60,600, May 12, 1993, abandoned.

[30] Foreign Application Priority Data

Jul. 24, 1992 [JP] Japan ................... 4-217478
Oct. 7, 1992 [JP] Japan ................... 4-268542

[51] Int. Cl.$^6$ .................... C09K 19/00; B05D 3/12
[52] U.S. Cl. ................ 428/1; 427/371; 427/372.2; 427/384; 359/36; 359/55; 359/74; 359/75; 359/76; 359/77; 359/82
[58] Field of Search ............... 428/1; 427/372, 427/372.2, 384; 359/36, 55, 74, 75, 76, 77, 82

[56] References Cited

U.S. PATENT DOCUMENTS 4,735,492  4/1988  Sekine et al. ............ 528/353
5,115,089  5/1992  Yoshida et al. .......... 528/353

FOREIGN PATENT DOCUMENTS 62-174725  7/1987  Japan .
63-249127  10/1988  Japan .
1180518  7/1989  Japan .
1303413  12/1989  Japan .

OTHER PUBLICATIONS

The Chemical Society of Japan; Preprint for the 13th Liquid Crystal Forum issued in Oct. 1987 (Abstract); pp. 14–15; "Rubbing Alignment Technique for High Pretilt Angle in a Liquid Crystal Cell".

*Primary Examiner*—James J. Seidleck
*Assistant Examiner*—P. Hampton-Hightower
*Attorney, Agent, or Firm*—Pennie & Edmonds

[57] ABSTRACT

An alignment film for liquid crystal is provided which comprises a polyimide comprising a repeating unit of the general formula (I):

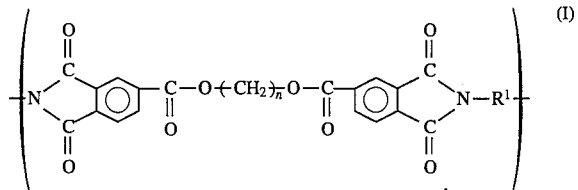

wherein n is an integer of from 2 to 16 and $R^1$ represents a divalent organic group. This polyimide is obtained for example, from a reaction between ethylene glycol bis(trimellitate dianhydride) and 4,4'-diaminodiphenyl ether. This polyimide or a varnish of a precursor thereof is coated on a plate, and dried to obtain an alignment film for liquid crystal, which stably exhibits a high pretilt angle, irrespective of curing temperatures. The present invention further provides a liquid crystal-sandwiched panel and a liquid crystal display module prepared using the alignment film as well as a material for the preparation of the alignment film.

14 Claims, No Drawings

ALIGNMENT FILM FOR LIQUID CRYSTAL, LIQUID CRYSTAL-SANDWICHED PANEL, LIQUID CRYSTAL DISPLAY MODULE AND MATERIAL FOR LIQUID CRYSTAL ALIGNMENT FILM

This is a continuation of application Ser. No. 08/060,600, filed on May 12, 1993, now abandoned.

BACKGROUND OF THE INVENTION

1. Field of the Invention

The present invention relates to an alignment film for liquid crystal, a liquid crystal-sandwiched panel, a liquid crystal display module and a material for liquid crystal alignment film.

2. Description of the Related Art

Heretofore, in liquid crystal display modules for large displays, the STN (supertwisted nematic) system has been adopted to ensure improved visual characteristics. In this STN system, the long axis director of liquid crystal molecules in a cell is twisted 240° to 270°. For the manufacture of liquid crystal display modules in which the STN system is adopted, it is necessary to provide a material for liquid crystal alignment film with which a high pretilt angle is stably attained.

Various methods for obtaining an alignment film for liquid crystal which exhibits a high pretilt angle have been proposed, which include:

(1) a method in which use is made of a polyimide comprising a carbon chain and, bonded thereto, a fluoroalkyl group (see Japanese Patent Application Laid-Open Specification No. 62-174725 and U.S. Pat. No. 4,735,492);

(2) a method in which an amine compound having a long chain fluoroalkyl group is added to a polyimide (see Japanese Patent Application Laid-Open Specification No. 1-180518); and (3) a method in which a metal complex having a long chain fluoroalkyl group is added to a polyimide (see Preprint for the 13th Liquid Crystal Forum, issued in October, 1987).

All of these methods, however, have a drawback in that the pretilt angle obtained is not stable.

Further, in accordance with the increase in the preference for color display modules, a material for liquid crystal alignment film from which a film can be formed at low curing temperatures has increasingly been desired because of the limitation attributed to the heat resistance properties of color filters.

SUMMARY OF THE INVENTION

With a view toward developing an alignment film for liquid crystal free from the above-mentioned drawbacks of the prior art, i.e., stably exhibiting a high pretilt angle irrespective of curing temperatures, the present inventors have made extensive and intensive studies. As a result, they have unexpectedly found that the desired alignment film for liquid crystal is obtained by the employment of a polyimide having a specific repeating unit. Based on this novel finding, the present invention has been completed.

It is, therefore, an object of the present invention to provide an alignment film for liquid crystal stably exhibiting a high pretilt angle irrespective of curing temperatures.

It is another object of the present invention to provide a liquid crystal-sandwiched panel comprising the above-mentioned alignment film for liquid crystal.

It is a further object of the present invention to provide a liquid crystal display module comprising the above-mentioned liquid crystal-sandwiched panel.

It is still a further object of the present invention to provide a material for use in the preparation of the above-mentioned alignment film for liquid crystal.

The foregoing and other objects, features and advantages of the present invention will become apparent from the following detailed description and appended claims.

Detailed Description of the Invention

In one aspect of the present invention, there is provided an alignment film for liquid crystal comprising a polyimide comprising a repeating unit of the general formula (I):

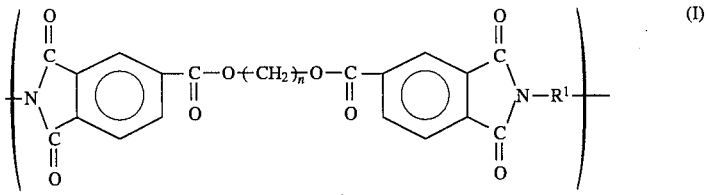

wherein n is an integer of from 2 to 16 and $R^1$ represents a divalent organic group.

It is preferred that in addition to the repeating unit of general formula (I), the above-mentioned polyimide comprise a repeating unit of the general formula (II):

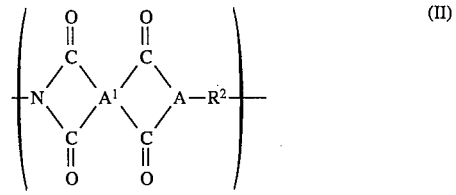

wherein $A^1$ represents a tetravalent residue of a tetracarboxylic dianhydride containing an alicyclic structure, and $R^2$ represents a divalent organic group.

For ensuring a high pretilt angle, it is preferred that in general formula (I), n be an integer of from 6 to 16 and $R^1$ represent a phenylene group.

Further, in addition to the repeating unit of general formula (I) and the repeating unit of general formula (II), the polyimide for use in the present invention may comprise a repeating unit of the general formula (III):

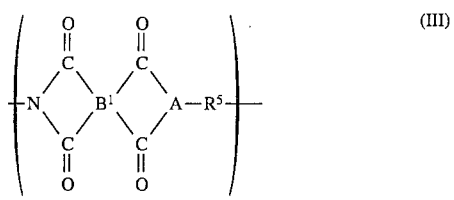

wherein $B^1$ represents a tetravalent residue of a tetracarboxylic dianhydride other than those employed in the repeating units of general formulae (I) and (II), and $R^5$ represents a divalent organic group.

It is preferred that the polyimide for use in the present invention comprise the repeating unit of general formula (I) in an amount of from 5 to 100 mol. %, especially from 20 to 100 mol. %. A polyimide resin comprising the repeating units of general formula (I) ensures stable exhibition of high pretilt angle irrespective of curing temperatures. In particular, in the case of a polyimide comprising the repeating unit of general formula (I) in which n is an integer of from 6 to 16 and $R^1$ represents a phenylene group, the content of this repeating unit in the polyimide is preferably in the range of from 5 to 100 mol. %, more preferably from 20 to 100 mol. %, and most preferably from 30 to 100 mol. %.

Such a polyimide ensures not only stable exhibition of a pretilt angle irrespective of curing temperatures but also a high pretilt angle. When the content of the above-mentioned repeating unit is smaller than the above lower limit, the pretilt angle is likely to become unfavorably small.

Moreover, it is preferred that the polyimide for use in the present invention comprise the repeating unit of general formula (I) and the repeating unit of general formula (II) in respective amounts of from 5 to 95 mol. % and from 5 to 95 mol. %, especially from 20 to 80 mol. % and from 20 to 80 mol. %. In the polyimide, the balance for causing the whole to be 100 mol. % may be comprised of the repeating unit of general formula (III). When the content of the repeating unit of general formula (I) in the polyimide is smaller than the above lower limit, the pretilt angle is likely to become unfavorably small. On the other hand, when the content of the repeating unit of general formula (II) in the polyimide is smaller than the above lower limit, the voltage holding ratio is likely to become unfavorably small.

In connection with the voltage holding ratio, the following description is made. Known for TV displays and matrix displays is an active twisted nematic liquid crystal display module comprising an electrode plate having, mounted thereon, a vast plurality of image element electrodes and vast pluralities of TFT (electric field-effective thin film transistor) elements and MIM (metal-insulating layer-metal electric field-effective element) elements for conducting ons and offs. In such an active liquid crystal display module, a drain voltage occurs by application of a pulse to a gate of the TFT, and the drain voltage is gradually lowered until the subsequent pulse application. The degree of the lowering of the drain voltage is designated "voltage holding ratio". It is preferred that the voltage holding ratio be as high as possible from the viewpoint that desirable display characteristics are obtained with the active liquid crystal display module.

The liquid crystal-sandwiched panel of the present invention is provided in such a manner that a pair of electrode plates, e.g., glass plates each having a transparent electrode of ITO (indium tin oxide) or the like are disposed to face and spaced from each other, a liquid crystal is put between the electrode plates, and alignment films for liquid crystal according to the present invention are formed on at least one electrode plates.

From this liquid crystal-sandwiched panel, a liquid crystal display module may be produced according to conventional techniques, by mounting a polarizing plate etc. thereon.

The alignment film for liquid crystal according to the present invention may be produced from a material for liquid crystal alignment film comprising a polyamic acid as a precursor of a polyimide.

Accordingly, in still a further aspect of the present invention, there is provided a material for liquid crystal alignment film comprising a polyamic acid comprising a repeating unit of the general formula (I'):

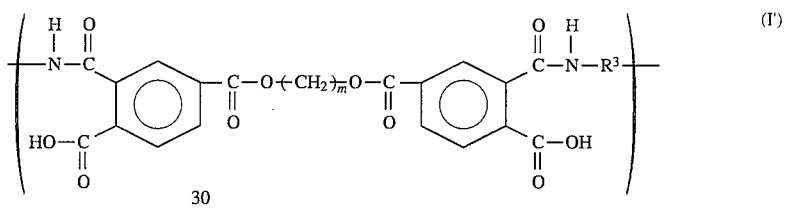

wherein m is an integer of from 2 to 16 and $R^3$ represents a divalent organic group.

It is preferred that the polyimide acid comprises repeating units of the general formula (I') wherein m is an integer of from 6 to 16 and $R^3$ is a phenylene group.

Further, it is preferred that in addition to the repeating unit of general formula (I'), the polyamic acid comprise a repeating unit of the general formula (II'):

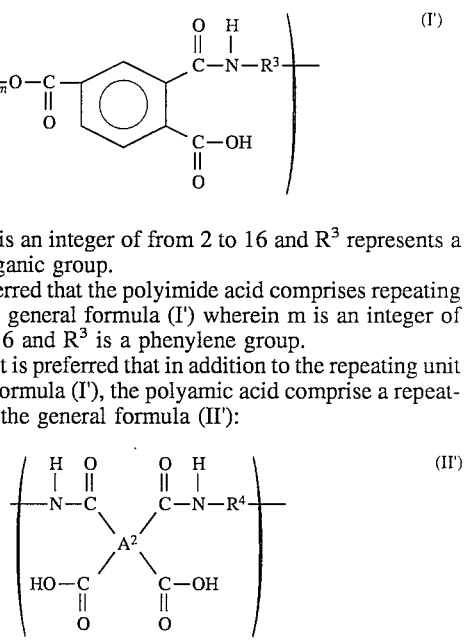

wherein $A^2$ represents a tetravalent residue of a tetracarboxylic dianhydride containing an alicyclic structure, and $R^4$ represents a divalent organic group.

Further, in addition to the repeating unit of general formula (I') and the repeating unit of general formula (II'), the polyamic acid for use in the present invention may comprise a repeating unit of the general formula (III'):

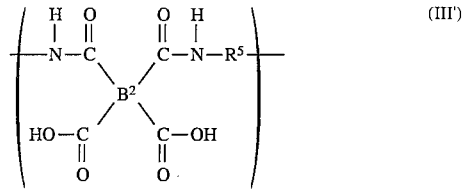

wherein $B^2$ represents a tetravalent residue of a tetracarboxylic dianhydride other than those employed in the repeating units of general formulae (I') and (II'), and $R^5$ represents a divalent organic group.

The polyamic acid for use in the present invention preferably comprises the repeating unit of general formula (I') in an amount of from 5 to 100 mol. %, more preferably from 20 to 100 mol. %. In particular, in the case of a polyamic acid comprising the repeating unit of general formula (I') in which m is an integer of from 6 to 16 and $R^5$ represents a phenylene group, the content of this repeating unit in the polyamic acid is preferably in the range of from 5 to 100 mol. %, more preferably from 20 to 100 mol. %, and most preferably from 30 to 100 mol. %.

Moreover, it is preferred that the polyamic acid for use in the present invention comprise the repeating unit of general formula (I') and the repeating unit of general formula (II') in respective amounts of from 5 to 95 mol. % and from 5 to 95 mol. %, especially from 20 to 80 mol. % and from 20 to 80 mol. %. In the polyamic acid, the balance for causing the whole to be 100 mol. % may be comprised of the repeating unit of general formula (III').

The alignment film for liquid crystal according to the present invention may be produced from a material for liquid crystal alignment film comprising a polyimide resin, which is the generic term for the above described polyimide and precursors thereof. The precursors of the polyimide include the above described polyamic acid and products resulting from partial imidization of the polyamic acid.

Therefore, in still a further aspect of the present invention, there is provided a material for liquid crystal alignment film comprising a polyimide resin produced by reacting an acid component comprising a tetracarboxylic dianhydride of the general formula (IV):

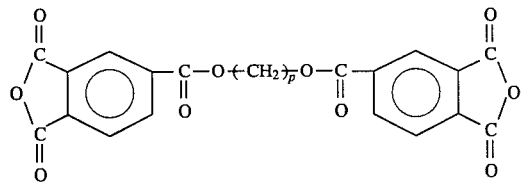

wherein p is an integer of from 2 to 16, with a diamine component.

In the manufacture of the polyimide resin, it is preferred that in addition to the tetracarboxylic dianhydride of general formula (IV), the acid component comprises a tetracarboxylic dianhydride of the general formula (VI):

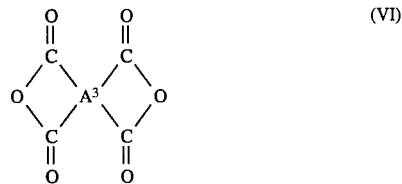

wherein $A^3$ represents a tetravalent residue of a tetracarboxylic dianhydride containing an alicyclic structure.

In the manufacture of the polyimide resin for use in the present invention, the acid component preferably comprises the tetracarboxylic dianhydride of general formula (IV) in an amount of from 5 to 100 mol. %, more preferably from 20 to 100 mol. %. When the polyimide resin comprises the tetracarboxylic dianhydride of general formula (VI), the acid component preferably comprises the tetracarboxylic dianhydride of general formula (IV) and the tetracarboxylic dianhydride of general formula (VI) in respective amounts of from 5 to 95 mol. % and from 5 to 95 mol. %, more preferably from 20 to 80 mol. % and from 20 to 80 mol. %.

In the manufacture of the polyimide resin, in the case of a tetracarboxylic dianhydride of general formula (IV) in which p is an integer of from 6 to 16, it is preferably that the tetracarboxylic dianhydride in the acid component is included in the range of from 5 to 100 mol. %, more preferably from 20 to 100 mol. %, and most preferably from 30 to 100 mol. %. Further, the diamine component preferably comprises in an amount of from 20 to 100 mol. %, more preferably from 30 to 100 mol. % at least one phenylenediamine selected from the group consisting of o-phenylenediamine, m-phenylenediamine and p-phenylenediamine of the general formula (V):

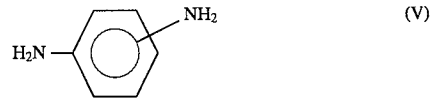

wherein one amine group is at an ortho-, meta- or para-position with respect to the other amine group.

In the manufacture of the polyimide resin, a tetracarboxylic dianhydride other than those of the general formulae (IV) and (VI) may be employed to constitute 100 mol. % for the acid component, and a diamine other than that of general formula (V) may be employed to constitute 100 mol. % for the diamine component.

Representative examples of tetracarboxylic dianhydrides indicated in general formula (IV) in which p is an integer of 2 to 5 include:

ethylene glycol bis(trimellitate anhydride), 1,3-propanediol bis(trimellitate anhydride), 1,4-butanediol bis(trimellitate anhydride), and 1,5-pentanediol bis(trimellitate anhydride).

Representative examples of tetracarboxylic dianhydrides of general formula (IV) in which p is an integer of 6 to 16 include:

1,6-hexanediol bis(trimellitate anhydride), 1,7-heptanediol bis(trimellitate anhydride), 1,8-octanediol bis(trimellitate anhydride), 1,9-nonanediol bis(trimellitate anhydride), 1,10-decanediol bis(trimellitate anhydride), 1,12-dodecanediol bis(trimellitate anhydride), and 1,16-hexadecanediol bis(trimellitate anhydride).

The above tetracarboxylic dianhydrides may be used in combination.

Representative examples of tetracarboxylic dianhydrides indicated in general formula (VI) include:

butane-1,2,3,4-tetracarboxylic dianhydride, cyclobutane-1,2,3,4-tetracarboxylic dianhydride, cyclopentane-1,2,3,4-tetracarboxylic dianhydride, cyclohexane-1,2,4,5-tetracarboxylic dianhydride, 3,4,3',4'-bicyclohexyltetracarboxylic dianhydride, bis[bicyclo(2,2,1)hepta-2,3-dicarboxylic anhydride]sulfone, 1,3-di(3,4-dicarboxycyclohexyl)cyclohexanol dianhydride, bicyclo(2,2,1)hepta-2,3,5,6-tetracarboxylic dianhydride, bicyclo(2,2,2)octa-7-ene-2,3,5,6-tetracarboxylic dianhydride, decahydronaphthalene-1,4,5,8-tetracarboxylic dianhydride, and 4,8-dimethyl-1,2,3,5,6,7-hexahydronaphthalene-1,2,5,6-tetracarboxylic dianhydride. These may be used in combination.

That is, it is preferred that each of $A^1$ of general formula (II), $A^2$ of general formula (II') and $A^3$ of general formula (VI) be a tetravalent organic group having 4 to 30 carbon atoms.

Representative examples of tetracarboxylic dianhydrides other than those indicated in general formulae (IV) and (VI) include:

pyromellitic anhydride,
3,3',4,4'-diphenyltetracarboxylic dianhydride,
1,2,5,6-naphthalenetetracarboxylic dianhydride,
2,3,6,7-naphthalenetetracarboxylic dianhydride,
2,2', 3,3'-diphenyltetracarboxylic dianhydride,
2,2-bis(3,4-dicarboxyphenyl)propane dianhydride,
bis(3,4-dicarboxyphenyl)sulfone dianhydride,
3,4,9,10-perylenetetracarboxylic dianhydride,
bis(3,4-dicarboxyphenyl) ether dianhydride,
naphthalene-1,2,4,5-tetracarboxylic dianhydride,
naphthalene-1,4,5,8-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
benzene-1,2,3,4-tetracarboxylic dianhydride,
3,4,3',4'-benzophenonetetracarboxylic dianhydride,
2,3,2',3'-benzophenonetetracarboxylic dianhydride,
2,3,3',4'-benzophenonetetracarboxylic dianhydride,
pyrazine-2,3,5,6-tetracarboxylic dianhydride,
thiophene-2,3,4,5-tetracarboxylic dianhydride,
ethylenetetracarboxylic dianhydride,
2,3,3',4'-biphenyltetracarboxylic dianhydride,
3,4,3',4'-biphenyltetracarboxylic dianhydride,
2,3,2',3'-biphenyltetracarboxylic dianhydride,
bis(3,4-dicarboxyphenyl)dimethylsilane dianhydride,
bis(3,4-dicarboxyphenyl)methylphenylsilane dianhydride,
bis(3,4-dicarboxyphenyl)diphenylsilane dianhydride,
bis(2,3-dicarboxyphenyl)dimethylsilane dianhydride,
1,4-bis(3,4-dicarboxyphenyldimethylsilyl)benzene dianhydride,
1,3-bis(3,4-dicarboxyphenyl)-1,1,3,3-tetramethyldicyclohexane dianhydride,
p-phenylbis(trimellitic acid monoester anhydride),
4,4'-bis(3,4-dicarboxyphenoxy)diphenyl sulfide dianhydride,
2,2-bis(2,3-dicarboxyphenyl)hexafluoropropane dianhydride,
2,2-bis(3,4-dicarboxyphenyl)hexafluoropropane dianhydride,
2,2-bis[4-(3,4-dicarboxyphenoxy)phenyl]hexafluoropropane dianhydride,
1,4-bis(2-hydroxyhexafluropropyl)benzenebistrimellitic dianhydride,
1,3-bis(2-hydroxyhexafluropropyl)benzenebistrimellitic dianhydride,
(trifluoromethyl)pyromellitic dianhydride,
bis(trifluoromethyl)pyromellitic dianhydride,
5,5'-bis(trifluoromethyl)-3,3',4,4'-biphenyltetracarboxylic dianhydride,
2,2',5,5'-tetrakis(trifluoromethyl)-3,3',4,4'-biphenyltetracarboxylic dianhydride,
5,5'-bis(trifluoromethyl)-3,3',4,4'-diphenyl ethertetracarboxylic dianhydride,
5,5'-bis(trifluoromethyl)-3,3',4,4'-benzophenonetetracarboxylic dianhydride,
bis[(trifluoromethyl)dicarboxyphenoxy]benzene dianhydride,
bis[(trifluoromethyl)dicarboxyphenoxy]biphenyl dianhydride,
bis[(trifluoromethyl)dicarboxyphenoxy](trifluoromethyl)- benzene dianhydride,
bis[(trifluoromethyl)dicarboxyphenoxy]bis(trifluoromethyl)biphenyl dianhydride,
bis[(trifluoromethyl)dicarboxyphenoxy]diphenyl ether dianhydride,
bis(dicarboxyphenoxy)(trifluoromethyl)benzene dianhydride,
bis(dicarboxyphenoxy)bis(trifluoromethyl)benzene dianhydride,
bis(dicarboxyphenoxy)tetrakis(trifluoromethyl)benzene dianhydride,
bis(dicarboxyphenoxy)bis(trifluoromethyl)biphenyl dianhydride, and
bis(dicarboxyphenoxy)tetrakis(trifluoromethyl)biphenyl dianhydride. These may be used in combination.

That is, it is preferred that each of $B^1$ of general formula (III) and $B^2$ of general formula (III') be a tetravalent organic group having 6 to 30 carbon atoms.

In the manufacture of the polyimide resin, the acid component may contain a hexacarboxylic trianhydride in addition to the tetracarboxylic dianhydrides indicated in general general formulae (IV) and (VI).

Representative examples of hexacarboxylic trianhydrides include:

1,1,1-tris[(phthalic anhydride)-4-yl-carboxymethyl]ethane,
1,1,1-tris[(phthalic anhydride)-4-yl-carboxymethyl]propane,
1,2,3-tris[(phthalic anhydride)-4-yl-carboxy]propane,
1,3,5-tris[(phthalic anhydride)-4-yl-carboxy]hexane, and
1,3,5-tris[(phthalic anhydride)-4-yl-carboxy]benzene.

These may be used in combination, and may be used together with the above-mentioned tetracarboxylic dianhydride other than those indicated in general general formulae (IV) and (VI). The diamine component may contain o-phenylenediamine, m-phenylenediamine and p-phenylenediamine. These may be used in combination.

Representative examples of diamine component other than the diamine of the general formula (V) include:
4-(4-aminophenyl)-3-aminobenzoic acid,
2,2-bis(4-aminophenyl)propane,
2,6-diaminopyridine,
bis(4-aminophenyl)diethylsilane,
bis(4-aminophenyl)diphenylsilane,
bis(4-aminophenyl)ethylphosphine oxide,
bis(4-aminophenyl)-N-butylamine,
bis(4-aminophenyl)-N-methylamine,
N-(3-aminophenyl)-4-aminobenzamide,
3,3'-diaminodiphenylmethane, 3,3'-diaminodiphenyl ether,
3,3'-diaminodiphenyl sulfone,
3,3'-diaminodiphenylpropane,
3,3'-diaminodiphenyl sulfide,
m-xylenediamine,
2,4-diaminotoluene,
2,6-diaminotoluene,
4,4'-diaminodiphenylpropane,
4,4'-diaminodiphenylmethane,
3,3'-diaminobenzophenone,
4,4'-diaminodiphenyl sulfide,
4,4'-diaminodiphenyl sulfone,
4,4'-diaminodiphenyl ether,
3,4'-diaminodiphenyl ether,
1,5-diaminonaphthalene,
2,4-bis(β-amino-t-butyl)toluene,
bis(p-β-amino-t-butyl-phenyl)ether,
bis(p-β-methyl-γ-aminopentyl)benzene,
bis-p-(1,1-dimethyl-5-aminopentyl)benzene,
2,2-bis(4-aminophenyl)hexafluoropropane,
2,2-bis[4-(2-aminophenoxy)phenyl]hexafluoropropane,
2,2-bis[4-(3-aminophenoxy)phenyl]hexafluoropropane,
2,2-bis[4-(4-aminophenoxy)phenyl]hexafluoropropane,
2,2-bis(3-carbamoyl-4-aminophenyl)hexafluoropropane,
2,2-bis[4-(3-carbamoyl-4-aminophenoxy)phenyl] hexafluoropropane,
2,2-bis(3-sulfamoyl-4-aminophenyl)hexafluoropropane,
2,2-bis[4-(3-sulfamoyl-4-aminophenoxy)phenyl] hexafluoropropane,
2,2-bis(3-carboxy-4-aminophenyl)hexafluoropropane,
2,2-bis[4-(3-carboxy-4-aminophenoxy)phenyl]hexafluoropropane,
1,3-bis{2-[4-(4-aminophenoxy)phenyl] hexafluoroisopropyl}benzene,
p-bis(3-carboxy-4-aminophenoxy)tetrafluorobenzene,
4,4'-bis(3-carboxy-4-aminophenoxy)octafluorobiphenyl,
4,4'-diaminooctafluorobiphenyl,
1,2-bis(3-carboxy-4-aminophenyl)tetrafluoroethane,
1,3-bis(3-carboxy-4-aminophenyl)hexafluoropropane,
1,5-bis(3-carboxy-4-aminophenyl)decafluoropentane,
diaminobenzotrifluoride,
bis(trifluoromethyl)phenylenediamine,
diaminotetra(trifluoromethyl)benzene,
diamino(pentafluoroethyl)benzene,
2,2'-bis(trifluoromethyl)benzidine,
2,2'-bis(trifluoromethyl)-4,4'-diaminodiphenyl ether,
bis(aminophenoxy)di(trifluoromethyl)benzene,
bis(aminophenoxy)tetrakis(trifluoromethyl)benzene,
bis[(trifluoromethyl)aminophenoxy]benzene,
bis[(trifluoromethyl)aminophenoxy]biphenyl,
bis{[(trifluoromethyl)aminophenoxy] phenyl}hexafluoropropanehexamethylenediamine,
heptamethylenediamine,
octamethylenediamine,
nonamethylenediamine,
decamethylenediamine,
tetramethylenediamine,
propylenediamine,
ethylenediamine,
3-methylheptamethylenediamine,
4,4-dimethylheptamethylenediamine,
2,11-diaminododecane,
1,2-bis(3-aminopropoxy)ethane,
2,2-dimethylpropylenediamine,
3-methoxy-hexamethylenediamine,
2,5-dimethylhexamethylenediamine,
2,5-dimethylheptamethylenediamine,
5-methylnonamethylenediamine,
2,17-diaminoeicosadecane,
1,4-diaminocyclohexane,
1,10-diamino-1,10-dimethyldecane,
1,12-diaminooctadecane,
3,3'-dimethyl-4,4'-diaminodiphenylmethane,
3,3'-diethyl-4,4'-diaminodiphenylmethane,
3,3'-dimethoxy-4,4'-diaminodiphenylmethane,
3,3'-diethoxy-4,4'-diaminodiphenylmethane,
3,3'-difluoro-4,4'-diaminodiphenylmethane,
3,3'-dichloro-4,4'-diaminodiphenylmethane,
3,3'-dibromo-4,4'-diaminodiphenylmethane,
3,3'-di(trifluoromethyl)-4,4'-diaminodiphenylmethane,
3,3'-diisopropyl-4,4'-diaminodiphenyl ether,
3,3'-dimethoxy-4,4'-diaminodiphenyl ether,
3,3'-diethoxy-4,4'-diaminodiphenyl ether,
3,3'-difluoro-4,4'-diaminodiphenyl ether,
3,3'-dibromo-4,4'-diaminodiphenyl ether,
3,3'-di(trifluoromethyl)-4,4'-diaminodiphenyl ether,
3,3'-dimethyl-4,4'-diaminodiphenyl sulfone,
3,3'-dimethoxy-4,4'-diaminodiphenyl sulfone,
3,3'-diethoxy-4,4'-diaminodiphenyl sulfone,
3,3'-difluoro-4,4'-diaminodiphenyl sulfone,
3,3'-dichloro-4,4'-diaminodiphenyl sulfone,
3,3'-dibromo-4,4'-diaminodiphenyl sulfone,
3,3'-di(trifluoromethyl)-4,4'-diaminodiphenyl sulfone,
3,3'-dimethyl-4,4'-diaminodiphenylpropane,
3,3'-dimethoxy-4,4'-diaminodiphenylpropane,
3,3'-diethoxy-4,4'-diaminodiphenylpropane,
3,3'-difluoro-4,4'-diaminodiphenylpropane,
3,3'-dichloro-4,4'-diaminodiphenylpropane,
3,3'-dibromo-4,4'-diaminodiphenylpropane,
3,3'-di(trifluoromethyl)-4,4'-diaminodiphenylpropane,
3,3'-dimethyl-4,4'-diaminodiphenyl sulfide,
3,3'-dimethoxy-4,4'-diaminodiphenyl sulfide,
3,3'-diethoxy-4,4'-diaminodiphenyl sulfide,
3,3'-difluoro-4,4'-diaminodiphenyl sulfide,
3,3'-dichloro-4,4'-diaminodiphenyl sulfide,
3,3'-dibromo-4,4'-diaminodiphenyl sulfide,
3,3'-di(trifluoromethyl)-4,4'-diaminodiphenyl sulfide,
3,3'-dimethyl-4,4'-diaminodiphenylhexafluoropropane,
3,3'-dimethoxy-4,4'-diaminodiphenylhexafluoropropane,
3,3'-diethoxy-4,4'-diaminodiphenyihexafluoropropane,
3,3'-difluoro-4,4'-diaminodiphenylhexafluoropropane,
3,3'-dichloro-4,4'-diaminodiphenylhexafluoropropane,
3,3'-dibromo-4,4'-diaminodiphenylhexafluoropropane, 3,3'-di(trifluoromethyl)-4,4'-diaminodiphenylhexafluoropropane,
3,3'-dimethyl-4,4'-diaminobenzophenone,
3,3'-dimethoxy-4,4'-diaminobenzophenone,
3,3'-diethoxy-4,4'-diaminobenzophenone,
3,3'-difluoro-4,4'-diaminobenzophenone,
3,3'-dichloro-4,4'-diaminobenzophenone,
3,3'-dibromo-4,4'-diaminobenzophenone,
3,3'-di(trifluoromethyl)-4,4'-diaminobenzophenone,
3,3'-dimethylbenzidine,
3,3',5,5'-tetramethyl-4,4'-diaminodiphenylmethane,
3,3',5,5'-tetraisopropyl-4,4'-diaminodiphenylmethane,
3,3',5,5'-tetramethoxy-4,4'-diaminodiphenylmethane,
3,3',5,5'-tetraethoxy-4,4'-diaminodiphenylmethane,
3,3',5,5'-tetrafluoro-4,4'-diaminodiphenylmethane,
3,3',5,5'-tetrachloro-4,4'-diaminodiphenylmethane,
3,3',5,5'-tetrabromo-4,4'-diaminodiphenylmethane,
3,3',5,5'-tetra(trifluoromethyl)-4,4'-diaminodiphenylmethane,
3,3',5,5'-tetramethyl-4,4'-diaminodiphenyl ether,
3,3',5,5'-tetraethyl-4,4'-diaminodiphenyl ether,
3,3',5,5'-tetramethoxy-4,4'-diaminodiphenyl ether,
3,3',5,5'-tetraethoxy-4,4'-diaminodiphenyl ether,
3,3',5,5'-tetrafluoro-4,4'-diaminodiphenyl ether,
3,3',5,5'-tetrachloro-4,4'-diaminodiphenyl ether,
3,3',5,5'-tetrabromo-4,4'-diaminodiphenyl ether,
3,3',5,5'-tetra(trifluoromethyl)-4,4'-diaminodiphenyl ether,
3,3',5,5'-tetramethyl-4,4'-diaminodiphenyl sulfone,
3,3',5,5'-tetramethoxy-4,4'-diaminodiphenyl sulfone,
3,3',5,5'-tetraethoxy-4,4'-diaminodiphenyl sulfone,
3,3',5,5'-tetrafluoro-4,4'-diaminodiphenyl sulfone,
3,3',5,5'-tetrachloro-4,4'-diaminodiphenyl sulfone,
3,3',5,5'-tetrabromo-4,4'-diaminodiphenyl sulfone,
3,3',5,5'-tetra(trifluoromethyl)-4,4'-diaminodiphenylsulfone,
3,3',5,5'-tetramethyl-4,4'-diaminodiphenylpropane,
3,3',5,5'-tetramethoxy-4,4'-diaminodiphenylpropane,
3,3',5,5'-tetraethoxy-4,4'-diaminodiphenylpropane,
3,3',5,5'-tetrafluoro-4,4'-diaminodiphenylpropane,
3,3',5,5'-tetrachloro-4,4'-diaminodiphenylpropane,
3,3',5,5'-tetrabromo-4,4'-diaminodiphenylpropane,
3,3',5,5'-tetra(trifluoromethyl)-4,4'-diaminodiphenylpropane,
3,3',5,5'-tetramethyl-4,4'-diaminodiphenyl sulfide,
3,3',5,5'-tetramethoxy-4,4'-diaminodiphenyl sulfide,
3,3',5,5'-tetraethoxy-4,4'-diaminodiphenyl sulfide,
3,3',5,5'-tetrafluoro-4,4'-diaminodiphenyl sulfide,
3,3',5,5'-tetrachloro-4,4'-diaminodiphenylsulfide,
3,3',5,5'-tetrabromo-4,4'-diaminodiphenyl sulfide,
3,3',5,5'-tetra(trifluoromethyl)-4,4'-diaminodiphenyl sulfide,
3,3',5,5'-tetramethyl-4,4'-diaminodiphenylhexafluoropropane,
3,3',5,5'-tetramethoxy-4,4'-diaminodiphenylhexafluoropropane,
3,3',5,5'-tetraethoxy-4,4'-diaminodiphenylhexafluoropropane,
3,3',5,5'-tetrafluoro-4,4'-diaminodiphenylhexafluoropropane,
3,3',5,5'-tetrachloro-4,4'-diaminodiphenylhexafluoropropane,
3,3',5,5'-tetrabromo-4,4'-diaminodiphenylhexafluoropropane,
3,3',5,5'-tetra(trifluoromethyl)-4,4'-diaminodiphenylhexafluoropropane,
3,3',5,5'-tetramethyl-4,4'-diaminobenzophenone,
3,3',5,5'-tetramethoxy-4,4'-diaminobenzophenone,
3,3',5,5'-tetraethoxy-4,4'-diaminobenzophenone,
3,3',5,5'-tetrafluoro-4,4'-diaminobenzophenone,
3,3',5,5'-tetrachloro-4,4'-diaminobenzophenone,
3,3',5,5'-tetrabromo-4,4'-diaminobenzophenone,
3,3',5,5'-tetra(trifluoromethyl)-4,4'-diaminobenzophenone,
3,3',5,5'-tetraisopropyl-4,4'-diaminodiphenylmethane,
3,3'-diisopropyl-5,5'-dimethyl-4,4'-diaminodiphenylmethane,
3,3'-diisopropyl-5,5'-diethyl-4,4'-diaminodiphenylmethane,
3,3'-diisopropyl-5,5'-dimethyl-4,4'-diaminodiphenyl ether,
3,3'-diisopropyl-5,5'-diethyl-4,4'-diaminodiphenyl ether,
3,3'-diisopropyl-5,5'-dimethyl-4,4'-diaminodiphenylpropane,
3,3'-diisopropyl-5,5'-diethyl-4,4'-diaminodiphenylpropane,
3,3'-diisopropyl-5,5'-dimethyl-4,4'-diaminodiphenyl sulfone,
3,3'-diisopropyl-5,5'-diethyl-4,4'-diaminodiphenyl sulfone,
3,3'-bis(trifluoromethyl)benzidine,
2,2'-bis(trifluoromethyl)-4,4'-diaminodiphenyl ether,
3,3'-bis(trifluoromethyl)-4,4'-diaminodiphenyl ether,
3,3',5,5'-tetrakis(trifluoromethyl)-4,4'-diaminodiphenyl ether,
and 3,3'-bis(trifluoromethyl)-4,4'-diaminobenzophenone.

These may be used in combination. Of them, aromatic diamines are preferred because of their superior heat resistance properties.

Further, the diamines suitable for use in the present invention include diaminosilicons, such as 1,3-bis(3-aminopropyl)-1,1,3,3-tetraphenyldisiloxane,
1,3-bis(3-aminopropyl)-1,1,3,3-tetramethyldisiloxane, and
1,3-bis(4-aminobutyl)-1,1,3,3-tetramethyldisiloxane.

When such a diaminosilicon is used, it is preferably contained in the diamine component in an amount of 0.1 to 10 mol %. The use of such a diaminosilicon generally improves the adhesion of the resultant polyimide resin to a plate for preparing a liquid crystal-sandwiched panel.

As will be apparent from the above, it is preferred that $R^1$ of general formula (I), $R^2$ of general formula (II), $R^3$ of general formula (I'), $R^4$ of general formula (II') and $R^5$ of general formula (III) be a divalent organic group having 2 to 30 carbon atoms.

In the manufacture of the polyimide resin for use in the present invention, the above-mentioned tetracarboxylic dianhydride is reacted with the above-mentioned diamine at appropriate temperatures. In this reaction, the degree of imidization can be regulated to a desired level by choosing appropriate conditions. For example, a polyimide in which imidization is complete or nearly complete can be obtained by a reaction at a temperature of at least 100° C., especially at least 120° C., optionally in the presence of a catalyst, such as tributylamine, triethylamine or triphenyl phosphite (the catalyst is preferably used in an amount of 0 to 15% by weight, more preferably 0.01 to 15% by weight, based on the weight of the reaction components). On the other hand, a polyamic acid which is just a precursor of a polyimide without undergoing no or substantially no imidization can be obtained by a reaction at a temperature of up to 80° C., especially up to 50° C.

Likewise, a polyimide precursor having undergone partial imidization can be produced.

Also, a polyimide in which imidization is complete or nearly complete can be produced by heating the above-mentioned polyamic acid or the above-mentioned polyimide precursor having undergone partial imidization at a temperature of at least 100° C., especially at least 120° C. to effect imidization, or alternatively by performing a chemical cyclization (imidization) in which use is made of a cyclization agent, such as an acid anhydride (e.g., acetic anhydride, propionic anhydride and benzoic anhydride) and a carbodiimide (e.g., dicyclohexylcarbodiimide), optionally in the presence of a cyclization catalyst, such as pyridine, isoquinoline, trimethylamine, aminopyridine and imidazole (the cyclization agent and the cyclization catalyst are individually preferably used in an amount of 1 to 8 mol. per mol. of the acid anhydride). These imidization reactions are preferably performed in an organic solvent.

As such an organic solvent suitable for the above reactions, various polar organic solvents can be mentioned, which include N,N-dimethylformamide, N,N-dimethylacetamide, N-methyl-2-pyrrolidone, dimethyl sulfoxide, hexamethylphosphoramide, phenol, m-cresol and chlorobenzene. These may be used in combination, if miscible with each other. Together with such polar organic solvents, general-purpose solvents, such as toluene, xylene, cellosolve acetate and methyl cellosolve, may be used as long as these do not lower the solubility of a polyimide or a precursor thereof in the polar organic solvent. The addition sequence of reaction components to the solvent is not particularly limited.

With respect to the thus obtained polyimide resin, it is preferred that a polyimide precursor, particularly a polyamic acid, be soluble in N,N-dimethylacetamide in a concentration of 0.1 g/dl, and that the reduced viscosity thereof measured at 30° C. is at least 0.1 dl/g. When the solubility in a solvent is too small, the concentration of the polyimide precursor, such as a polyamic acid, is so low that a polyimide film obtained by thermal curing cannot have a satisfactory thickness. When the reduced viscosity is too small, also, the resultant polyimide film cannot have a satisfactory thickness.

In the present invention, a polyimide exhibiting a desirable glass transition temperature can be easily produced. This is attributed to the characteristics of the polyimide for use in the present invention such that the greater the length of the methylene chain (number of n) in the repeating unit of general formula (I), the lower the glass transition temperature of the polyimide. Accordingly, the glass transition temperature of a final polyimide resin can be regulated by choosing the length of the methylene chain (number of p) in a tetracarboxylic dianhydride [general formula (IV)] being a raw material for producing a polyamic acid of a polyimide precursor. It is generally preferred that the glass transition temperature of the polyimide resin be in the range of from 100° to 270° C.

When the glass transition temperature is lower than the above lower limit, the heat resistance of the polyimide resin becomes poor. On the other hand, when the glass transition temperature is higher than the above upper limit, the curing temperature of the polyimide resin becomes unfavorably high.

The material for liquid crystal alignment film according to the present invention comprises the polyimide resin according to the present invention. The polyimide resin is preferably employed in the form of a solution (varnish) in an organic solvent, such as those mentioned above with respect to the production of the polyimide resin. A suitable organic solvent is chosen taking into consideration the solubility of the polyimide resin.

Of the polyimide resin, a polyimide precursor, such as polyamic acid, has excellent solubility in organic solvents.

The material for liquid crystal alignment film according to the present invention is applied to for example, an electrode plate, such as a glass plate having, disposed thereon, a transparent electrode of ITO (indium tin oxide) or the like, and is dried to form a polyimide film on the electrode plate. For the application of the material, various methods may be employed, which include a dipping method, a printing method and a spraying method. The drying temperature is generally in the range of from 100° to 250° C., preferably from 150° to 230° C. When a polyimide precursor, such as a polyamic acid, is employed as a polyimide resin, the drying temperature is to be not lower than the temperature at which cyclization reaction occurs.

That is, for the polyimide precursor, the drying temperature is preferably 180° C. or above, more preferably 200° C. or above. The drying is preferably performed for a period of from 1 min to 6 hr, more preferably from 1 min to 3 hr. In order to improve the adhesion between the polyimide film and the electrode plate, a coupling agent may be provided therebetween, which includes a silane coupling agent and a titanium coupling agent.

The thus prepared polyimide film disposed on the electrode plate is subjected to surface rubbing treatment before use as an alignment film for liquid crystal.

A pair of electrode plates each having a rubbed polyimide film as produced according to the above procedure are set so that the polyimide films are faced and spaced each other, thereby obtaining a liquid crystal cell. A liquid crystal is put of the liquid crystal cell to thereby obtain a liquid crystal-sandwiched panel. A polarizing plate and other parts are mounted on the liquid crystal-sandwiched panel to thereby obtain a liquid crystal display module for use in TV displays, matrix displays, etc.

The alignment film for liquid crystal according to the present invention is especially suitable for use in a liquid crystal display module in which an STN system is adopted exhibiting a twist angle of 240° to 270°, and an active twisted nematic liquid crystal display module. In particular, an alignment film of a polyimide containing a repeating unit of general formula (II) in its molecular structure is especially suitable for use in an active twisted nematic liquid crystal display module.

PREFERRED EMBODIMENT OF THE INVENTION

The present invention will now be described in greater detail with reference to the following Examples and Comparative Examples, which should not be construed as limiting the scope of the present invention.

SYNTHETIC EXAMPLE 1

Put in a four-necked flask equipped with a thermometer, a stirrer, a nitrogen introduction tube and a drying tube were 8 g of N,N-dimethylacetamide and 0.20 g (2 mmol) of 4,4'-diaminodiphenyl ether of the formula (17):

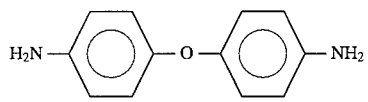 (17)

The contents of the flask were stirred until a homogeneous solution was obtained. After the dissolution of the diamine, 0.82 g (2 mmol) of ethyleneglycol bis(trimellitate anhydride) of the formula (18):

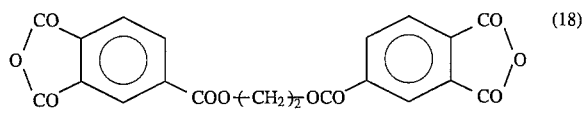 (18)

was added little by little. After the completion of the addition, the mixture was stirred for 5 hours while cooling with an ice bath to effect a reaction, thereby obtaining a solution of a polyamic acid.

SYNTHETIC EXAMPLE 2

Put in a four-necked flask equipped with a thermometer, a stirrer, a nitrogen introduction tube and a drying tube were 8 g of N,N-dimethylformamide and 0.45 g (2 mmol) of 2,2-bis(4-aminophenyl)propane of the formula (20):

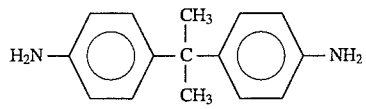 (20)

The contents of the flask were stirred until a homogeneous solution was obtained. After the dissolution of the diamine, 0.99 g (2 mmol) of 1,8-octanediol bis(trimellitate anhydride) of the formula (19):

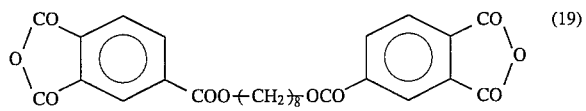 (19)

was added little by little. After the completion of the addition, the mixture was stirred for 2 hours while cooling with an ice bath and for 3 hours at room temperature to effect a reaction, thereby obtaining a solution of a polyamic acid.

SYNTHETIC EXAMPLE 3

Put in a four-necked flask equipped with a thermometer, a stirrer, a nitrogen introduction tube and a drying tube were 8 g of N,N-dimethylacetamide, 0.23 g (1 mmol) of 2,2-bis(4-aminophenyl)propane of formula (20), and 0.20 g (1 mmol) of 4,4'-diaminodiphenylmethane of the formula (21):

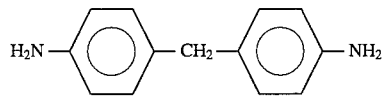 (21)

The contents of the flask were stirred until a homogeneous solution was obtained. After the dissolution of the diamines, a mixture of 0.522 g (1 mmol) of 1,10-decanediol bis(trimellitate anhydride) of the formula (22):

 (22)

and 0.29 g (1 mmol) of 3,3',4,4'-diphenyltetracarboxylic dianhydride of the formula (23):

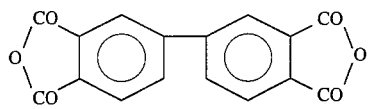 (23)

was added little by little. After the completion of the addition, the mixture was stirred for 5 hours at room temperature to effect a reaction, thereby obtaining a solution of a polyamic acid.

SYNTHETIC EXAMPLE 4

A solution of a polyamic acid was obtained in substantially the same manner as in Synthetic Example 2, except that in place of 0.99 g (2 mmol) of 1,8-octanediol bis(trimellitate anhydride), use was made of 0.64 g (2 mmol) of 3,3',4,4'-benzophenonetetracarboxylic dianhydride of the formula (24):

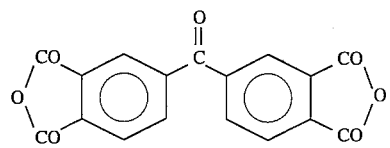 (24)

SYNTHETIC EXAMPLE 5

Put in a four-necked flask equipped with a thermometer, a stirrer, a nitrogen introduction tube and a drying tube were 8 g of N,N-dimethylacetamide and 0.40 g (2 mmol) of 4,4'-diaminodiphenyl ether of formula (17). The contents of the flask were stirred until a homogeneous solution was obtained. After the dissolution of the diamine, a mixture of 0.52 g (1 mmol) of 1,10-decanediol bis(trimellitate anhydride) of formula (22) and 0.22 g (1 mmol) of 1,2,4,5-cyclohexanetetracarboxylic dianhydride of the formula (25):

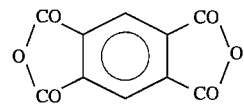 (25)

was added little by little. After the completion of the addition, the mixture was stirred for 5 hours while cooling with an ice bath to effect a reaction, thereby obtaining a solution of a polyamic acid.

SYNTHETIC EXAMPLE 6

Put in a four-necked flask equipped with a thermometer, a stirrer, a nitrogen introduction tube and a drying tube were 8 g of N-methyl-2-pyrrolidone and 0.45 g (2 mmol) of 2,2-bis(4-aminophenyl)propane of formula (20). The contents of the flask were stirred until a homogeneous solution was obtained. After the dissolution of the diamine, a mixture of 0.84 g (1.6 mmol) of 1,10-decanediol bis(trimellitate anhydride) of formula (22) and 0.08 g (0.4 mmol) of 1,2,3,4-cyclopentanetetracarboxylic dianhydride of the formula (26):

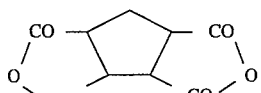 (26)

was added little by little. After the completion of the addition, the mixture was stirred for 5 hours at room temperature to effect a reaction, thereby obtaining a solution of a polyamic acid.

SYNTHETIC EXAMPLE 7

Put in a four-necked flask equipped with a thermometer, a stirrer, a nitrogen introduction tube and a drying tube were 8 g of N,N-dimethylacetamide, 0.27 g (1.2 mmol) of 2,2-bis(4-aminophenyl)propane of formula (20), and 0.16 g (0.8 mmol) of 4,4'-diaminodiphenylmethane of formula (21). The contents of the flask were stirred until a homogeneous solution was obtained. After the dissolution of the diamines, a mixture of 0.36 g (0.8 mmol) of 1,5-pentanediol bis(trimellitate anhydride) of the formula (27):

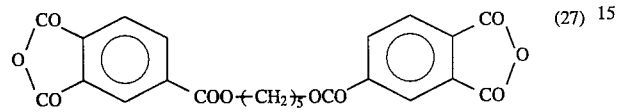

and 0.39 g (1.2 mmol) of 3,3',4,4'-dicyclohexyltetracarboxylic dianhydride of the formula (28):

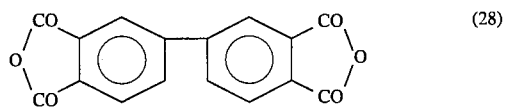

was added little by little. After the completion of the addition, the mixture was stirred for 5 hours at room temperature to effect a reaction, thereby obtaining a solution of a polyamic acid.

SYNTHETIC EXAMPLE 8

Put in a four-necked flask equipped with a thermometer, a stirrer, a nitrogen introduction tube and a drying tube were 8 g of N,N-dimethylacetamide and 0.40 g (2.0 mmol) of 4,4'-diaminodiphenyl ether of formula (17). The contents of the flask were stirred until a homogeneous solution was obtained. After the dissolution of the diamine, a mixture of 0.42 g (0.8 mmol) of 1,10-decanediol bis(trimellitate anhydride) of formula (22), 0.20 g (1.0 mmol) of 1,2,3,4-cyclobutanetetracarboxylic dianhydride of the formula (29):

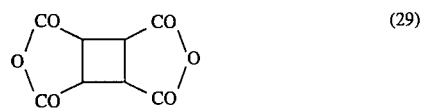

and 0.06 g (0.2 mmol) of 3,3',4,4'-benzophenonetetracarboxylic dianhydride of formula (24), was added little by little. After the completion of the addition, the mixture was stirred for 5 hours while cooling in an ice bath to effect a reaction, thereby obtaining a solution of a polyamic acid.

SYNTHETIC EXAMPLE 9

A solution of a polyamic acid was obtained in substantially the same manner as in Synthetic Example 5, except that in place of 0.52 g (1 mmol) of 1,10-decanediol bis(trimellitate anhydride) and 0.22 g (1 mmol) of 1,2,4,5-cyclohexanetetracarboxylic dianhydride, use was made of 0.64 g (2 mmol) of 3,3',4,4'-benzophenonetetracarboxylic dianhydride of formula (24).

SYNTHETIC EXAMPLE 10

A solution of a polyamic acid was obtained in substantially the same manner as in Synthetic Example 6, except that in place of 0.84 g (1.6 mmol) of 1,10-decanediol bis(trimellitate anhydride) and 0.08 g (0.4 mmol) of 1,2,3,4-cyclopentanetetracarboxylic dianhydride, use was made of 0.42 g (2.0 mmol) of 1,2,3,4-cyclopentanetetracarboxylic dianhydride only.

SYNTHETIC EXAMPLE 11

Put in a four-necked flask equipped with a thermometer, a stirrer, a nitrogen introduction tube and a drying tube were 9 g of N,N-dimethylacetamide and 1.08 g (10 mmol) of p-phenylenediamine. The contents of the flask were stirred until a homogeneous solution was obtained. Then, a mixture of 0.99 g (5 mmol) of butane-1,2,3,4-tetracarboxylic dianhydride of the formula (30):

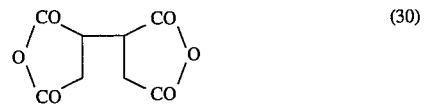

and 2.47 g (5 mmol) of 1,8-octanediol bis(trimellitate anhydride) of formula (19), was added little by little. After the completion of the addition, the mixture was stirred for 5 hours at room temperature to effect a reaction, thereby obtaining a solution of a polyamic acid.

SYNTHETIC EXAMPLE 12

A solution of a polyamic acid was obtained in substantially the same manner as in Synthetic Example 11, except that 1.78 g (9 mmol) of butane-1,2,3,4-tetracarboxylic dianhydride of formula (30) was used, and that 0.52 g (1 mmol) of 1,10-decanediol bis(trimellitate anhydride) of formula (22) was used The reduced viscosity of each of the polyamic acids obtained in Synthetic Examples 1 to 12 was measured, and the results are shown in Table 1. The reduced viscosity was measured by a method in which first, the polyamic acid solution obtained in each of the synthetic examples was put in water or methanol to precipitate the polyamic acid, secondly the precipitated polyamic acid was filtered off and dried, thirdly the dried polyamic acid was dissolved in N,N-dimethylacetamide in a concentration of 0.1 g/dl, and thereafter the viscosity of the resultant solution was measured at 30° C.

Further, each of the polyamic acid solutions was spin coated on a glass plate, and heated for 30 min at each of successively increased temperatures of 150°, 200°, 250° and 300° C. to obtain a polyimide film. The glass transition temperature of the polyimide film was measured using DSC-7 of Perkin Elmer Co. at a temperature elevation rate of 10° C./min with about 10 mg of a sample. The results are also shown in Table 1.

TABLE 1

| | Reduced Viscosity of Polyamic Acid (dl/g) | Glass Transition Temperature of Polyimide (°C.) |
|---|---|---|
| Synthetic Example 1 | 0.95 | 178 |
| Synthetic Example 2 | 0.88 | 148 |
| Synthetic Example 3 | 0.55 | 192 |
| Synthetic Example 4 | 0.85 | 298 |
| Synthetic Example 5 | 0.98 | 172 |
| Synthetic Example 6 | 0.88 | 146 |

| | Reduced Viscosity of Polyamic Acid (dl/g) | Glass Transition Temperature of Polyimide (°C.) |
|---|---|---|
| Synthetic Example 7 | 0.53 | 195 |
| Synthetic Example 8 | 1.02 | 207 |
| Synthetic Example 9 | 0.94 | 280 |
| Synthetic Example 10 | 0.46 | 253 |
| Synthetic Example 11 | 0.53 | 235 |
| Synthetic Example 12 | 0.45 | 263 |

SYNTHETIC EXAMPLE 13

Put in a four-necked flask equipped with a thermometer, a stirrer, a nitrogen introduction tube and a drying tube were 8 g of N,N-dimethylacetamide and 0.22 g (2 mmol) of p-phenylenediamine. The contents of the flask were stirred for 10 min. Then, 1.04 g (2 mmol) of 1,10-decanediol bis(trimellitate anhydride) of formula (22) was added little by little. After the completion of the addition, the mixture was stirred for 5 hours while cooling in an ice bath to effect a reaction, thereby obtaining a solution of a polyamic acid.

SYNTHETIC EXAMPLE 14

Put in a four-necked flask equipped with a thermometer, a stirrer, a nitrogen introduction tube and a drying tube were 8 g of N,N-dimethylformamide, 1.73 g (1.6 mmol) of p-phenylenediamine and 0.8 g (0.4 mmol) of 4,4'-diaminodiphenyl ether of formula (17). The contents of the flask were stirred for 10 min. Then, 0.99 g (2 mmol) of 1,8-octanediol bis(trimellitate anhydride) of formula (19) was added little by little. After the completion of the addition, the mixture was stirred for 2 hours while cooling with an ice bath and then for 3 hours at room temperature to effect a reaction, thereby obtaining a solution of a polyamic acid.

SYNTHETIC EXAMPLE 15

Put in a four-necked flask equipped with a thermometer, a stirrer, a nitrogen introduction tube and a drying tube were 8 g of N,N-dimethylacetamide and 0.22 g (2 mmol) of p-phenylenediamine. The contents of the flask were stirred for 10 min. Then, a mixture of 0.52 g (1 mmol) of 1,10-decanediol bis(trimellitate anhydride) of formula (22) and 0.20 g (1 mmol) of butane-1,2,3,4-tetracarboxylic dianhydride of formula (30), was added little by little. After the completion of the addition, the mixture was stirred for 5 hours at room temperature to effect a reaction, thereby obtaining a solution of a polyamic acid.

SYNTHETIC EXAMPLE 16

Put in a four-necked flask equipped with a thermometer, a stirrer, a nitrogen introduction tube and a drying tube were 40 g of N,N-dimethylacetamide, 0.86 g (8 mmol) of p-phenylenediamine, 0.25 g (1 mmol) of 3,3',5,5'-tetramethyl-4,4'-diaminodiphenylmethane of formula (31):

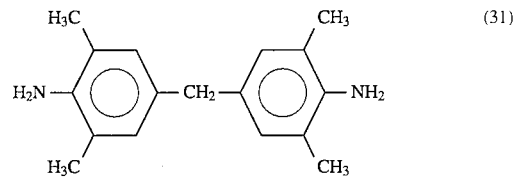

and 0.25 g (1 mmol) of 1,3-bis(3-aminopropyl)-1,1,3,3-tetramethyldisiloxane of the formula (32):

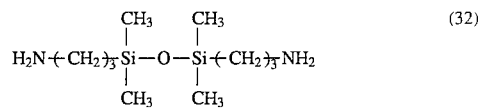

The contents of the flask were stirred for 10 min. Then, a mixture of 2.35 g (4.5 mmol) of 1,10-decanediol bis(trimellitate anhydride) of formula (22), 0.89 g (4.5 mmol) of butane-1,2,3,4-tetracarboxylic dianhydride of formula (30) and 0.45 g (0.7 mmol) of 1,1,1-tris[(phthalic anhydride)-4-ylcarboxymethyl]ethane of the formula (33):

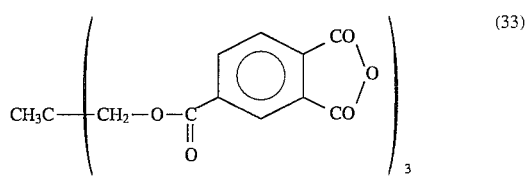

was added little by little. After the completion of the addition, the mixture was stirred for 5 hours at room temperature to effect a reaction, thereby obtaining a solution of a polyamic acid.

SYNTHETIC EXAMPLE 17

A solution of a polyamic acid was obtained in substantially the same manner as in Synthetic Example 13, except that 0.40 g (2 mmol) of 4,4'-diaminodiphenyl ether of formula (17) was used in place of 0.22 g (2 mmol) of p-phenylenediamine.

SYNTHETIC EXAMPLE 18

A solution of a polyamic acid was obtained in substantially the same manner as in Synthetic Example 13, except that 0.82 g (2 mmol) of ethylene glycol bis(trimellitate anhydride) of formula (18) was used in place of 1.04 g (2 mmol) of 1,10-decanediol bis(trimellitate anhydride) of formula (22).

Examples 1 to 9 and Comparative Examples 1 to 3

Each of the polyamic acid solutions obtained in Synthetic Examples 1 to 12 was diluted with N,N-dimethylacetamide to a concentration of about 5% by weight to thereby obtain a composition for liquid crystal alignment film. This composition was spinner coated on two glass plates each provided with a transparent electrode of ITO, and dried for 1 hr at each of temperatures of 180°, 230° and 250 ° C., thereby forming polyimide films with a thickness of 500 Å on the glass plates. These polyimide films were subjected to surface rubbing treatment, and the resultant plates were set so that the polyimide films to face each other in relationship such that the rubbing directions were antiparallel to each other, with an interstice therebetween, thereby obtaining a cell assembly. The periphery of the cell assembly was sealed with epoxy sealant EN-1000 (trade name of a product of Hitachi Chemical Co., Ltd.), which was cured by heating at 120° C. for 2 hr to thereby obtain a liquid crystal cell. Liquid crystal ZL1-1132 (trade name of a product of Merck Co.) was put in the liquid crystal cell at room temperature to thereby obtain a liquid crystal-sandwiched panel. The thus obtained liquid crystal-sandwiched panel was heated for 1 hr at 120° C. higher than the $T_{NI}$ (71° C.) of the liquid crystal, and then the pretilt angle of the panel was measured using a laser beam. The measurement results of pretilt angle are shown in Table 2 with reference to the polyamic acids employed (indicated by Synthetic Example No. in which the polyamic acid was obtained).

TABLE 2

Measurement Results of Pretilt Angle
(unit: degree)

| | Polyamide Acid Employed | Curing Temperature | | |
|---|---|---|---|---|
| | | 180° C. | 230° C. | 250° C. |
| Example 1 | Synthetic Example 1 | 2.15 | 2.20 | 2.21 |
| Example 2 | Synthetic Example 2 | 3.28 | 3.30 | 3.31 |
| Example 3 | Synthetic Example 3 | 2.98 | 3.00 | 3.01 |
| Comparative Example 1 | Synthetic Example 4 | 1.47 | 1.83 | 2.20 |
| Example 4 | Synthetic Example 5 | 2.45 | 2.48 | 2.51 |
| Example 5 | Synthetic Example 6 | 2.75 | 2.74 | 2.77 |
| Example 6 | Synthetic Example 7 | 2.80 | 2.97 | 2.99 |
| Example 7 | Synthetic Example 8 | 2.75 | 2.95 | 2.96 |
| Comparative Example 2 | Synthetic Example 9 | 0.52 | 0.69 | 0.84 |
| Comparative Example 3 | Synthetic Example 10 | 1.85 | 2.15 | 2.58 |
| Example 8 | Synthetic Example 11 | 3.67 | 3.78 | 4.21 |
| Example 9 | Synthetic Example 12 | 2.23 | 2.57 | 2.60 |

With respect to each of the liquid crystal cells obtained in Examples 4 to 9 and Comparative Examples 2 and 3, the voltage holding ratio was measured. The measurements results are shown in Table 3 with reference to the polyamic acids employed (indicated by Synthetic Example No. in which the polyamic acid was obtained).

The voltage holding ratio was measured by the following method. The ITO electrode of one of the glass electrode plates in the liquid crystal cell was electrically connected with a drain of a TFT module, while the ITO electrode of the other glass electrode plate in the liquid crystal cell was grounded. A gate signal with a pulse width of 100 μs and source signal with a frequency of 30 Hz and a voltage of ±4.5 V were input between a agate and a source of the TFT module, and drain voltage changes were measured by monitoring by means of a digital memory scope. The voltage holding ratio was defined as {[(value of drain voltage at time of rise of source signal)−(value of drain voltage applied at the time of fall of source signal)]/(value of drain voltage at the time of rise of source signal)}×100(%).

TABLE 3

Measurement Results of Voltage Holding Ratio
(unit: %)

| | Polyamic Acid Employed | Curing Temperature | | |
|---|---|---|---|---|
| | | 180° C. | 230° C. | 250° C. |
| Example 4 | Synthetic Example 5 | 93.8 | 95.4 | 94.9 |
| Example 5 | Synthetic Example 6 | 92.8 | 93.1 | 93.3 |
| Example 6 | Synthetic Example 7 | 90.0 | 90.5 | 90.9 |
| Example 7 | Synthetic Example 8 | 91.5 | 93.8 | 92.9 |
| Comparative Example 2 | Synthetic Example 9 | 32.5 | 42.2 | 55.3 |

TABLE 3-continued

Measurement Results of Voltage Holding Ratio
(unit: %)

| | Polyamic Acid Employed | Curing Temperature | | |
|---|---|---|---|---|
| | | 180° C. | 230° C. | 250° C. |
| Comparative Example 3 | Synthetic Example 10 | 82.2 | 90.3 | 92.3 |
| Example 8 | Synthetic Example 11 | 94.8 | 95.7 | 95.5 |
| Example 9 | Synthetic Example 12 | 96.7 | 96.5 | 97.2 |

In substantially the same manner as described above, the following was carried out. The polyamic acid solutions obtained in Synthetic Examples 1 to 3 and 5 to 7 were diluted to obtain compositions for liquid crystal alignment film. Using each of the compositions, polyimide films were formed in glass plate each having a transparant electrode of ITO in a manner such that 640×200 dots would be obtained. The polyimide films were subjected to surface rubbing treatment, and a liquid crystal cell was constructed so as to ensure a twist angle of 240°. Liquid crystal prepared by adding chiral agent S-811 (manufactured by Merck Co.) was inserted at room temperature in the liquid crystal cell, and heated at 120° C. for 1 hr to thereby obtain a liquid crystal-sandwitched panels were operable at 640×200 dots, and exhibited excellent display quality without alignment failure, such as domain.

Examples 10 to 13 and Comparative Examples 4 to 5

Each of the polyamic acid solutions obtained in Synthetic Examples 13 to 18 was diluted with N,N-dimethylacetamide to concentration of about 5% by weight to hereby obtain a composition was spinner coated on two glass plates each provided with a transparant electrode of ITO, and dried at 200° C. for 1 hr, thereby forming polyimide films with a thickness of 500 Å on the glass plates. These polyimide films were subjected to surface rubbing treatment, and the resultant plates were set so that the polyimide films are faced each other in relationship such that the rubbing directions were antiparallal to each other, thereby obtaining a cell assembly. The periphery of the cell assembly was sealed with epoxy sealant EN-1000 (trade name of a product of Hitachi Chemical Co., Ltd.), which was cured by heating at 120° C. for 2 hr to thereby obtain a liquid crystal cell. Liquid crystal ZLI-1132 (trade name of a product of Merck Co.) was put in the liquid crystal cell at room temperature to thereby obtain a liquid crystal-sandwitched panel. The thus obtained liquid crystal-sandwitched panel was heated for 1 hr at 120° C. higher than the $T_{NI}$ (71° C.) of the liquid crystal, and then the pretilt angle of the panel was measured using a laser beam. The measurement results of pretilt angle are shown in Table 4 with reference to the polyamic acids employed (indicated by Synthetic Example No. in which the polyamic acid was obtained).

TABLE 4

Measurement Results of Pretilt Angle

| | Polyamic Acid Employed | Pretilt Angle (deg.) |
|---|---|---|
| Example 10 | Synthetic Example 13 | 7.05 |
| Example 11 | Synthetic Example 14 | 4.03 |

TABLE 4-continued

Measurement Results of Pretilt Angle

| | Polyamic Acid Employed | Pretilt Angle (deg.) |
|---|---|---|
| Example 12 | Synthetic Example 15 | 5.15 |
| Example 13 | Synthetic Example 16 | 5.18 |
| Comparative Example 4 | Synthetic Example 17 | 2.48 |
| Comparative Example 5 | Synthetic Example 18 | 2.45 |

The polyamic acid solutions obtained in Synthetic Examples 10 to 13 were diluted to obtain compositions for liquid crystal alignment film. Using each of the compositions, polyimide films were formed on glass plates each having a transparent electrode of ITC) in a manner such that 640×200 dots would be obtained. The polyimide films were subjected to surface rubbing treatment, and a liquid crystal cell was constructed so as to ensure a twist angle of 240°. Liquid crystal prepared by adding chiral agent S811 (trade name of a product of Merck Co.) was inserted at room temperature in the liquid crystal cell, and heated at 120° C. for 1 hr to thereby obtain a liquid crystal-sandwiched panel. All of the thus obtained liquid crystal-sandwiched panels were operable at 640×200 dots, and exhibited excellent display quality without alignment failure, such as domain.

What is claimed is:

1. A manufacturing process of an alignment film for a liquid crystal, said process comprising the steps of forming a polyimide film and performing a rubbing treatment on the surface of said polyimide film so as to form an alignment film for liquid crystal, wherein:

said polyimide includes a polyamide having a repeating unit of general formula (I):

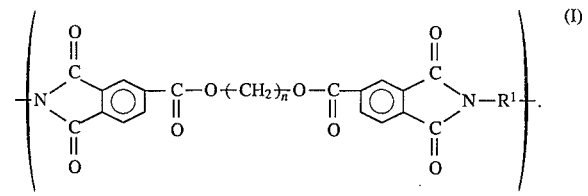

2. A manufacturing process of an alignment film for a liquid crystal according to claim 1, wherein n is an integer of from 6 to 16 and $R^1$ represents a phenylene group.

3. A manufacturing process of an alignment film for a liquid crystal according to claim 1, wherein said polyimide further comprises a repeating unit of the general formula (II):

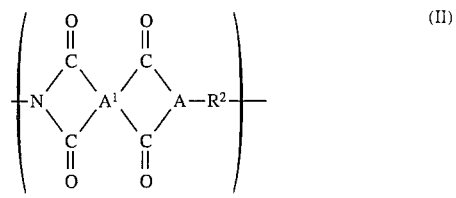

wherein $A^1$ represents a tetravalent residue of a tetracarboxylic dianhydride containing an alicyclic structure, and $R^2$ represents a divalent organic group.

4. A manufacturing process of an alignment film for a liquid crystal according to claim 3, wherein n is an integer from 6 to 16 and $R^1$ represents a phenylene group.

5. A liquid crystal-sandwiched panel comprising a pair of electrode plates disposed to face to and spaced from each other and a liquid crystal put between said pair of electrode plates, wherein an alignment film is formed on at least one of said electrode plates, wherein said alignment film is manufactured by a process comprising the steps of forming a polyimide film and performing a rubbing treatment on the surface of said polyamide film so as to form an alignment film for liquid crystal, wherein:

said polyimide includes a polyimide having a repeating unit of general formula (I):

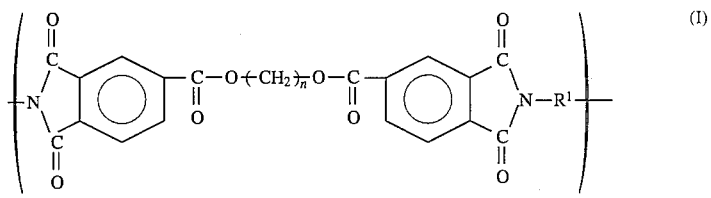

6. The liquid crystal-sandwiched panel of claim 5 wherein n is an integer of from 6 to 16 and $R^1$ represents a phenylene group.

7. The liquid crystal-sandwiched panel of claim 5, wherein said polyimide further comprises a repeating unit of the general formula (II):

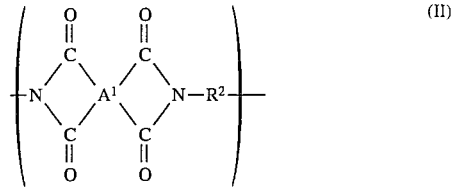

wherein $A^1$ represents a tetravalent residue of a tetracarboxylic dianhydride containing an alicyclic structure, and $R^2$ represents a divalent organic group.

8. The liquid crystal-sandwiched panel of claim 7 wherein n is an integer from 6 to 16 and $R^1$ represents a phenylene group.

9. A liquid crystal display module comprising the liquid crystal-sandwiched panel of claim 5.

10. A liquid crystal display module comprising the liquid crystal-sandwiched panel of claim 6.

11. A liquid crystal display module comprising the liquid crystal-sandwiched panel of claim 7.

12. A liquid crystal display module comprising the liquid crystal-sandwiched panel of claim 8.

13. A manufacturing process of an alignment film for a liquid crystal as defined in claim 1, wherein:

n is an integer of from 6 to 16; and said polyimide is a polyimide produced by reacting a tetracarboxylic dianhydride represented by the general formula (IV):

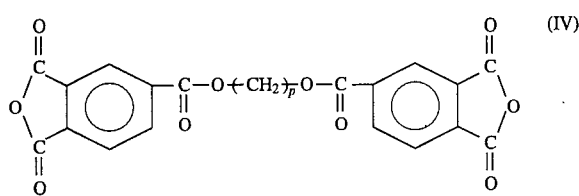 (IV)

and any one of diamine compounds selected from p-phenylenediamine, 2,2-bis(4-aminophenyl)propane, 4,4'-diaminodiphenylmethane, 4,4'-diaminodiphenyl ether, 3,3',5,5'-tetramethyl-4,4'-diaminodiphenylmethane and 1,3-bis(3-aminopropyl)-1,1,3,3-tetramethyldisiloxane.

14. A manufacturing process of an alignment film for liquid crystal as defined in claim 3, wherein:

n is an integer of from 6 to 16; and said polyimide is a polyimide produced by reacting a tetracarboxylic dianhydride represented by the general formula (IV):

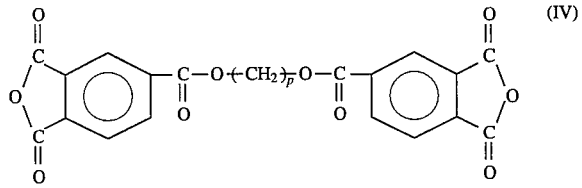 (IV)

and a diamine compound selected from the group consisting of p-phenylenediamine, 2,2-bis(4-aminophenyl)propane, 4,4'-diaminodiphenylmethane, 4,4'-diaminodiphenyl ether, 3,3',5 5'-tetramethyl-4,4'-diaminodiphenylmethane and 1,3-bis(3-aminopropyl)-1,1,3,3-tetramethyldisiloxane.

* * * * *